(12) United States Patent
Baek, IV et al.

(10) Patent No.: US 9,169,071 B2
(45) Date of Patent: Oct. 27, 2015

(54) EXTENDABLE CONVEYORS WITH LIGHTS

(71) Applicants: Anders Stougaard Baek, IV, Aarhus C (DK); Allan Falk, Horsens (DK); Mads Oestergaard, Viby J (DK); Brian Bondegaard Nielsen, Horsens (DK)

(72) Inventors: Anders Stougaard Baek, IV, Aarhus C (DK); Allan Falk, Horsens (DK); Mads Oestergaard, Viby J (DK); Brian Bondegaard Nielsen, Horsens (DK)

(73) Assignee: CALJAN RITE-HITE APS, Hasselager (DK)

( * ) Notice: Subject to any disclaimer, the term of this patent is extended or adjusted under 35 U.S.C. 154(b) by 0 days.

(21) Appl. No.: 13/782,742

(22) Filed: Mar. 1, 2013

(65) Prior Publication Data

US 2013/0299313 A1 Nov. 14, 2013

(30) Foreign Application Priority Data

Mar. 1, 2012 (EP) .................................... 12001400

(51) Int. Cl.
*B65G 21/14* (2006.01)
*B65G 21/10* (2006.01)
*B65G 67/08* (2006.01)
*B65G 15/26* (2006.01)

(52) U.S. Cl.
CPC ................ *B65G 15/26* (2013.01); *B65G 67/08* (2013.01)
USPC ........................ 198/539; 198/810.01; 198/812

(58) Field of Classification Search
CPC ......... B65G 21/10; B65G 21/14; B65G 67/08
USPC ..................................... 198/539, 810.01, 812
See application file for complete search history.

(56) References Cited

U.S. PATENT DOCUMENTS

| 2,721,645 | A |   | 10/1955 | Eberle |
|---|---|---|---|---|
| 3,837,510 | A | * | 9/1974 | McWilliams ................. 414/802 |
| 4,236,194 | A | * | 11/1980 | Norman ........................ 362/370 |
| 4,281,955 | A |   | 8/1981 | McWilliams |
| 4,425,069 | A |   | 1/1984 | Saur et al. |
| 4,774,799 | A | * | 10/1988 | Durant |
| 5,051,874 | A |   | 9/1991 | Guss |
| D353,701 | S |   | 12/1994 | Beavers et al. |

(Continued)

FOREIGN PATENT DOCUMENTS

| DE | 20202926 | 5/2002 |
|---|---|---|
| DE | 102010005267 | 7/2011 |

(Continued)

OTHER PUBLICATIONS

European Patent Office, "Extended European Search Report," issued in connection with European application serial No. 12001401.4, mailed Aug. 3, 2012, 7 pages.

(Continued)

*Primary Examiner* — Douglas Hess
(74) *Attorney, Agent, or Firm* — Hanley, Flight & Zimmerman, LLC

(57) ABSTRACT

Extendable conveyors with lights are disclosed herein. An example extendable conveyor disclosed herein includes a base unit and a mechanically extendable section, which is adjustably positionable between a nested position within the base unit and an extended position telescoped forwardly from the base unit. The conveyor includes a conveying surface to convey articles extending at least partially on an upper side of the mechanically extendable section. A light source is positioned at a lower side of the mechanically extendable section to illuminate at least an area below the mechanically extendable section.

35 Claims, 4 Drawing Sheets

(56) References Cited

U.S. PATENT DOCUMENTS

| | | | |
|---|---|---|---|
| D367,143 S | 2/1996 | Sauber | |
| 5,582,286 A | 12/1996 | Kalm et al. | |
| 6,092,911 A * | 7/2000 | Baker et al. | 362/253 |
| 6,843,362 B2 * | 1/2005 | Tachibana et al. | 198/460.1 |
| D572,875 S | 7/2008 | Ito et al. | |
| D580,123 S | 11/2008 | Ito et al. | |
| 7,537,101 B2 | 5/2009 | Aulanko et al. | |
| 7,775,339 B2 * | 8/2010 | Ogimura | 198/324 |
| 7,870,949 B2 | 1/2011 | Kanaris | |
| 7,909,153 B2 * | 3/2011 | Pogue | 198/315 |
| 7,983,821 B2 * | 7/2011 | Reeves | 701/50 |
| 8,033,775 B2 * | 10/2011 | Donelson et al. | 414/502 |
| 8,662,291 B2 | 3/2014 | Henderson | |
| 9,004,264 B2 | 4/2015 | Baek, IV et al. | |
| 2003/0019714 A1 | 1/2003 | Shaw et al. | |
| 2005/0087428 A1 | 4/2005 | Pelak et al. | |
| 2006/0133913 A1 | 6/2006 | Helmner | |
| 2008/0060386 A1 | 3/2008 | Kanno et al. | |
| 2009/0277753 A1 | 11/2009 | Violle | |
| 2010/0133214 A1 | 6/2010 | Evans | |
| 2011/0005902 A1 | 1/2011 | Kobs et al. | |
| 2013/0228419 A1 | 9/2013 | Baek, IV et al. | |
| 2013/0233676 A1 | 9/2013 | Baek, IV et al. | |

FOREIGN PATENT DOCUMENTS

| | | |
|---|---|---|
| DE | 102010033115 | 2/2012 |
| EP | 1568628 | 8/2005 |
| EP | 2003076 | 12/2008 |
| WO | 0208098 | 1/2002 |
| WO | 2006068443 | 6/2006 |

OTHER PUBLICATIONS

European Patent Office, "Extended European Search Report," issued in connection with European application serial No. 12001400.6, mailed Jul. 26, 2012, 7 pages.

European Patent Office, "Extended European Search Report," issued in connection with European application serial No. 12001399.0, mailed Aug. 2, 2012, 7 pages.

State Intellectual Property Office of P.R.China, "Notice of Granting Patent Right for Design," issued in connection with Chinese application serial No. 201230419164.X, issued Feb. 1, 2013, 4 pages.

European Patent Office, "Communication Pursuant to Article 94(3) EPC," issued in connection with European patent application No. 12 001 4014-1707, dated Apr. 30, 2014, 5 pages.

European Patent Office, "Communication Pursuant to Article 94(3) EPC," issued in connection with European patent application No. 12 001 399.0-1707, dated Apr. 30, 2014, 5 pages.

United States Patent and Trademark Office, "Office Action," issued in connection with U.S. Appl. No. 29/431,014, on Jul. 14, 2014 (6 pages).

United States Patent and Trademark Office, "Office Action," issued in connection with U.S. Appl. No. 13/782,740, on Jul. 9, 2014 (5 pages).

United States Patent and Trademark Office, "Notice of Allowance," issued in connection with U.S. Appl. No. 13/782,740, on Dec. 10, 2014 (13 pages).

The United States Patent and Trademark Office, "Non-Final Office Action," issued in connection with U.S. Appl. No. 13/782,744, dated Jan. 7, 2015, 39 pages.

European Patent Office, "Decision to grant a European patent pursuant to Article 97(1) EPC," issued in connection with European Patent Application No. 12001400.6, dated Jan. 22, 2015, 1 page.

The United States Patent and Trademark Office, "Notice of Allowance," issued in connection with U.S. Appl. No. 13/782,744, May 20, 2015, 23 pages.

The United States Patent and Trademark Office, "Notice of Allowance," issued in connection with U.S. Appl. No. 29/431,014, Apr. 10, 2015, 20 pages.

United States Patent and Trademark Office, "Supplemental Notice of Allowability," issued in connection with U.S. Appl. No. 13/782,744, Jun. 5, 2015, 6 pages.

United States Patent and Trademark Office, "Corrected Notice of Allowability," issued in connection with U.S. Appl. No. 13/782,744, Jun. 29, 2015, 6 pages.

United States Patent and Trademark Office, "Corrected Notice of Allowability," issued in connection with U.S. Appl. No. 29/431,014, Jul. 31, 2015, 6 pages.

* cited by examiner

EXTENDABLE CONVEYORS WITH LIGHTS

FIELD OF THE INVENTION

This disclosure relates generally to conveyors and, more particularly, to extendable conveyors with lights.

BACKGROUND OF THE INVENTION

The loading and unloading of packages from truck trailers or the like is typically a physically challenging task for which extendable conveyors are used.

Extendable conveyors, such as described in WO 2006/068443 A1 and DE 10 2010 005 267 A1, have a base unit and multiple extendable conveyor sections which are nested within each other. The total length of the extendable conveyor can be adjusted by extending or retracting the nested extendable conveyor sections. The end of the extendable conveyor, (e.g., the outmost extendable conveyor section), can move, for example, into a truck at a loading dock for loading or unloading goods. Such known extendable conveyors have a front light at the front of the outmost extendable conveyor section to illuminate the front area of the outmost conveyor section.

It is anticipated that the volume of loose-loaded goods being transported will continue to increase. Additionally, it is anticipated that attracting people to work in the (un)loading zone will become more difficult as smaller generations enter the labor market. Moreover, (un)loading zones are typically cramped and the environment in the zones is uncomfortable.

DETAILED DESCRIPTION

Figure 1:
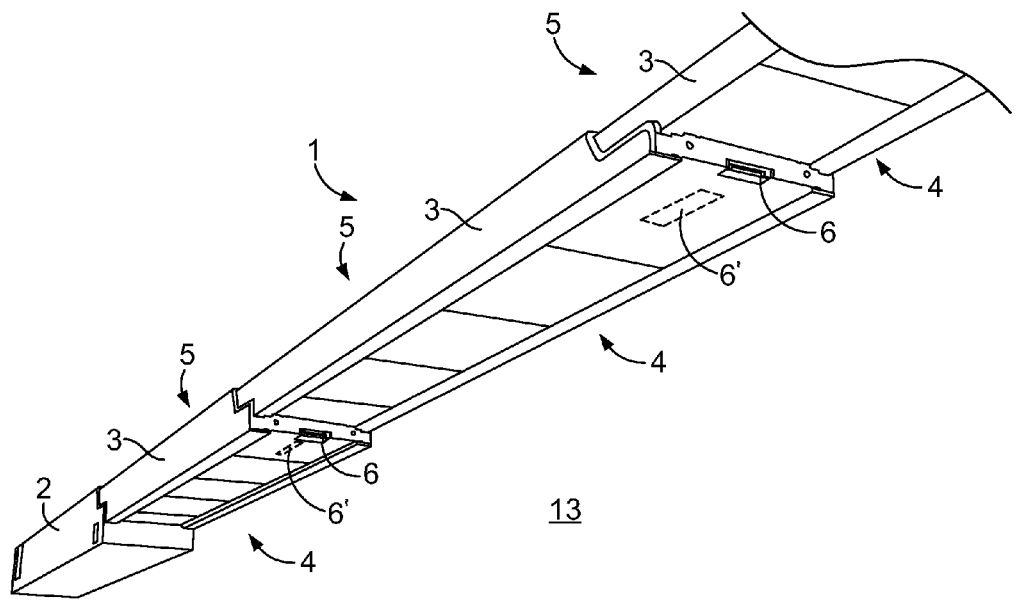
FIG. 1 illustrates an example extendable conveyor with light sources on each lower side of each extendable conveyor section constructed in accordance with the teachings disclosed herein.

FIG. 1 illustrates an example extendable conveyor 1 in accordance with the teachings disclosed herein.

As discussed in the outset extendable conveyors such as, for example, conveyors described in WO 2006/068443 A1 and DE 10 2010 005 267 A1, which are incorporated herein by reference in their entireties, have a base unit and multiple extendable conveyor sections which are nested within each other. The total length of the extendable conveyor can be adjusted by extending or retracting the nested extendable conveyor sections. The end of the extendable conveyor, (e.g., the outmost extendable conveyor section), can move, for example, into a truck at a loading dock for loading or unloading goods.

The inventors have recognized that, due to the uncomfortable environment typically surrounding the working area of an extendable conveyor, it might be difficult in future to attract people to work in the (un)loading zone at the extendable conveyor. Moreover, (un)loading zones are typically cramped and hazardous and, thus, the risk that personnel get hurt is high.

The inventors have also recognized that comfort for personnel working in a working area surrounding an extendable conveyor can be improved and the risk of injury to personnel can be reduced when the working area is properly illuminated by a light source on a lower side of the extendable conveyor.

In some examples, an extendable conveyor for conveying articles comprises a base unit, and at least one mechanically extendable section, which is adjustably positionable between a retracted position fully or partially nested within the base unit and an extended position fully or partially telescoped forwardly from the base unit.

In some examples, the base unit is configured to be moveable in the direction of the mechanically extendable sections and/or transversely to this direction.

The extendable conveyor comprises a conveying surface for conveying articles. The conveying surface extends at least partially on an upper side of the at least one mechanically extendable section. In some examples, the conveying surface also extends on the base unit. As known to the skilled person, the conveying surface can be formed by a belt and/or rollers.

In some examples, the extendable conveyor comprises two or more mechanically extendable sections, which are nested within each other and are disposed in a telescopic manner such that they are adjustably positionable between a retracted position fully or partially nested within the base unit and an extended position fully or partially telescoped forwardly from the base unit. The last mechanically extendable section at the end opposite to the base unit is also referred to as the outmost mechanically extendable section (or "outmost section"). The mechanically extendable sections between the base unit and the outmost mechanically extendable section are also referred to as intermediate mechanically extendable sections (or "intermediate section"). In examples where the extendable conveyor only comprises one mechanically extendable section, the "intermediate" and the "outmost" mechanically extendable section are the same.

For example, the mechanically extendable sections can be moved via a motor drive located in the base unit or any other mechanically extendable section via, for example, drive chains, wire ropes, (timing) belts, and/or the like, interconnecting the sections with each other such that the all mechanically extendable sections can be perform a telescopic movement by driving the motor drive accordingly. The telescopic movement mechanism of an extendable conveyor is generally known to the skilled person.

In some examples, an extendable conveyor comprises at least one light source positioned at a lower side of the at least one mechanically extendable section to illuminate at least an area below the at least one mechanically extendable section. The lower side is opposite to an upper side of the mechanically extendable section, on which the conveying surface is located. Thus, the light source illuminates an area between a ground and/or floor, over which the extendable conveyor and the mechanically extendable sections are located, and the lower side of the mechanically extendable sections.

By illuminating the area below the mechanically extendable section, a working area surrounding the extendable conveyor is also illuminated due to light rays from the light source being reflected by the ground and/or floor below the light source and/or by walls adjacent the light source. Due to diffuse reflections, the stray light rays illuminate an area or elevation above the position of the light source. Additionally or alternatively, depending on a reflection pattern of the light emitted from the light source, an area or elevation above the mechanically extendable sections may be illuminated, thereby illuminating a working area surrounding the mechanically extendable section(s). As a result, an illuminated work area facilitates loading or unloading articles on or from the conveying surfaces and enables personnel to easily read labels, box markings, etc., which may be positioned on the articles to be (un)loaded. Moreover, the likelihood of injury is reduced, since personnel can more easily see obstacles or sharp edges, etc., due to the illumination of the working area in which they are working.

In some examples, the light source comprises at least one light-emitting diode lamp. Light-emitting diode (LED) lamps have a good efficiency and high luminescence and, thus, power consumption of the light source is low in comparison with conventional lamps, such as fluorescent lamps.

In some examples, the light source is positioned such that it is not visible when the mechanically extendable section(s) are in the fully nested position. As discussed, the mechanically extendable section(s) are telescopically arranged such that one section is nested within another section. When all mechanically extendable sections are in the fully nested position, for example, when they are all retracted within the base unit, the light source of each mechanically extendable section(s) will be covered by an upper side of another (e.g., a next inner) extendable section and/or by the base unit. In some examples, the extendable conveyor is capable to detect that the mechanically extendable sections are in the fully nested position and the light source is switched off, for example, by a mechanical limiting switch which is triggered by an extendable section abutting against the switch located, for example, in the base unit and/or in each section(s).

In some examples, the at least one light source comprises a light reflector for reflecting light in a direction opposite to the lower side of the at least one mechanically extendable section and towards the area below the at least one mechanically extendable section. By reflecting the light of the light source in this way, the efficiency of the light source can be significantly enhanced. Moreover, the illumination of an area below the light source is improved while reducing the likelihood of (e.g., preventing), for example, temporarily blinding personnel working adjacent the light source. In some examples, the reflector is made of a heat conducting material such as metal (e.g. aluminum) and dissipates heat from the light source.

In some examples, the at least one light source comprises a lens cover. The lens cover can protect a light source lamp behind the cover. In some examples the lens cover is made of a material capable to withstand impacts or forces. Moreover, in some examples, the lens cover is shaped to spread or diffuse light rays originating from the lamp covered by the lens cover when the light rays pass through the lens cover. In some examples, the lens cover diffuses light rays to substantially equally or evenly distribute the light rays in the area to be illuminated.

In some examples, the light source is positioned and configured to radiate light rays in a direction below a height of about 1.5 meters. Thus, in some examples, personnel that are typically taller than about 1.5 meters are not temporarily blinded by the light source.

In some examples, as also indicated above, the extendable conveyor comprises at least two mechanically extendable sections. One of the at least two mechanically extendable sections is an outmost mechanically extendable section, and the remaining mechanically extendable sections are intermediate mechanically sections positioned between the base unit and the outmost mechanically extendable section. Each of the at least two mechanically extendable sections includes at least one light source positioned at its lower side.

In some examples, the outmost mechanically extendable section comprises at least one front light source for illuminating a front area below and/or in front of the outmost mechanically extendable section. The at least one front light source is positioned at a front part of the outmost mechanically extendable section. The front light is useful for illuminating the work area at the outmost mechanically extendable section, which is typically positioned in the (un)loading zone such as, for example, a container of a truck or the like. In some examples, the front light is configured and positioned to be non-blinding for some personnel (e.g., for personnel that are taller than 1.5 meters).

The at least one front light source comprises at least one of a light emitting diode lamp (such as discussed above), a lens cover (such as discussed above), and light reflector (such as discussed).

In some examples, the extendable conveyor further comprises at least one light sensor for sensing ambient light surrounding the light sensor. The at least one light source and/or the at least one front light source is switched to an on condition when an ambient light strength detected by the light sensor is below or less than a predefined value or threshold. The light sensor can be positioned at any location on the extendable conveyor. In some examples, the light sensor is positioned at the outmost mechanically extendable section in order to ensure that the working area surrounding the outmost mechanically extendable section is properly illuminated. In some examples, more than one light sensor is provided such that the light sources can be individually switched on/off based on an ambient light strength detected by one of the light sensors.

In some examples, the extendable conveyor further comprises at least one proximity sensor for sensing approaching personnel. The at least one light source and/or the at least one front light source is switched on when the proximity sensor detects an approaching personnel. Thereby, the safety in the working area can be improved, since the working area will be properly illuminated such that approaching personnel is able to see obstacles, sharp edges, or the like in the working area, thereby reducing the likelihood of injury.

In some examples, the lens cover and/or the reflector of a light source includes a wavelength filter for filtering out specific wavelengths. This can be useful to enhance the contrast of labels, box markings and/or the like to facilitate visibility of the labels, box markings and/or the like. In some examples, a specific filter is provided for adjusting a color temperature for the light rays going through the filter. Moreover, in some examples, the lens cover and/or the reflector are configured such that light rays are focused or directed in a downward direction such that, for example, a label, a box marking, and/or the like, on an article can be read. In some examples light rays are also defocussed by the lens cover and/or reflector.

In some examples, the lens cover and/or the reflector are moveable, for example, mechanically and/or electrically, such that light rays can be directed to a specific direction, for example, chosen by personnel.

In some examples, the extendable conveyor comprises a control unit which is configured to control the at least one light source and/or front light source discussed above such that the at least one light source and/or front light source is illuminated or driven in a predefined pattern, for example, in order to communicate a message to alert a personnel that, for example, a hazard exists. The predefined pattern for driving the at least one light source and/or front light source includes at least one of flashing, changing color, changing brightness, time sequence for switching on/off light sources in different sections, for example, one light source of each section after the other and/or any other pattern(s). Generally, such patterns are suitable that personnel can recognize that the light sources are driven not for illumination purposes, but for communication a message or alerting the personnel.

In some examples, the control unit is configured to drive the at least one light source and/or front light source in response to at least one of a movement of the base unit, a movement of the at least one mechanically extendable section, a detection of an approaching personnel, etc. As discussed, in the case that the base unit and/or the extendable sections are moved, a hazard may exist because personnel in the moving path of the conveyor may be injured. To warn or alert the personnel, the light sources can be driven in the discussed manner based on the predefined pattern. Moreover, in some examples, it is also detected whether personnel are in the area adjacent the conveyor or next to a specific section. Thus, in some examples, the light source next to the personnel is driven, for example, in a flashing manner in order to alert him or to communicate a message. For example, in some examples, flashing the light source next to personnel indicates or communicates a message that the personnel should move, for example, to the base unit or to the outmost end of the conveyor, while in other examples, flashing the light source communicates that the section is and/or will be extended/retracted.

In some examples, as also discussed above in detail, the extendable conveyor for conveying articles comprises a base unit, at least one mechanically extendable section, which is adjustably positionable between a nested position within the base unit and an extended position telescoped forwardly from the base unit, and a conveying surface for conveying articles extending at least partially on an upper side of the at least one mechanically extendable section. One of the at least one mechanically extendable section is an outmost mechanically extendable section including at least one light source positioned at its lower side for illuminating at least an area below the outmost mechanically extendable section and at least one front light source positioned at a front part of the outmost mechanically extendable section for illuminating a front area below and/or in front of the outmost mechanically extendable section.

All features described above are also realized in such examples alone or in combination.

In some examples, as discussed above in more detail, the extendable conveyor for conveying articles comprises a base unit, at least two mechanically extendable sections, which are adjustably positionable between a nested position within the base unit and an extended position telescoped forwardly from the base unit, wherein one of the at least two mechanically extendable sections is an outmost mechanically extendable section, and the remaining mechanically extendable sections are intermediate mechanically sections being positioned between the base unit and the outmost mechanically extendable section. A conveying surface for conveying articles extends at least partially on an upper side of the at least one mechanically extendable section, and each of the intermediate mechanically extendable sections includes at least one light source positioned at a front edge at its lower side for illuminating at least an area below each of the intermediate mechanically extendable sections. As discussed, the lower side of the intermediate and the outmost section is the side opposite to the upper side where the conveying surface is located. As each extendable section typically has a mechanical structure at below the conveying surface, the lower side of each section is not planar but typically has a specific height in some examples. Thus, at the lower side each section and, thus, also each intermediate section, a portion at the lower side has an L-shaped cross section including a planar area at the bottom face and a front face which vertically extends at the end of each section facing in the direction to the outmost end of the conveyor. Thereby, an edge is formed between the bottom face and the vertically extending front face at the lower side of each intermediate section. At this edge, for example in a middle area, the at least one light source is located in some examples. In some such examples, the light source extends partially at the bottom face and on the vertical face.

All features described above are also realized in such examples alone or in combination.

Figure 4:
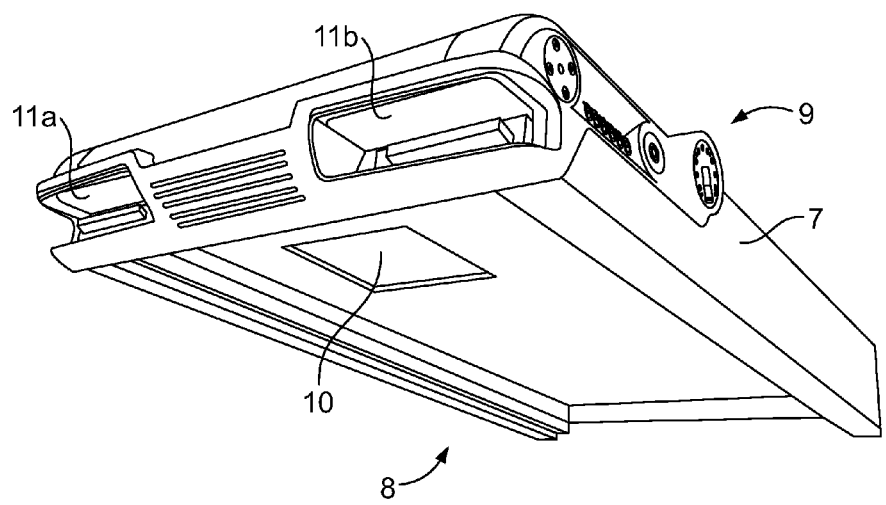
FIG. 4 illustrates an outmost extendable conveyor section of the example extendable conveyor of FIG. 1 showing a flooring light source on a lower side and a plurality of front light sources.
Figure 5:
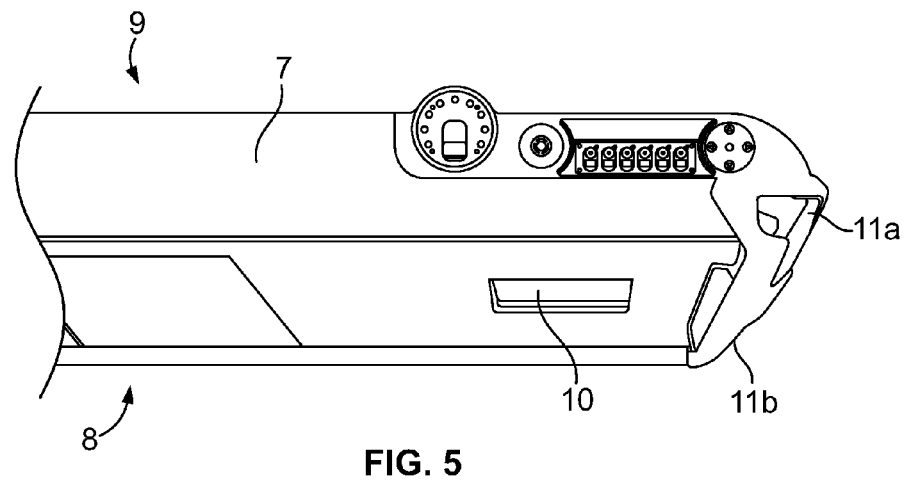
FIG. 5 is a side view of the example outmost extendable conveyor section.

Returning to FIG. 1, there is illustrated an embodiment of an extendable conveyor 1 constructed in accordance with the teachings disclosed herein. The extendable conveyor 1 has a base unit 2 and multiple mechanically extendable sections 3, 7, namely intermediate sections 3 and an outmost section 7 (FIGS. 4 to 6), which are mechanically extendable and which are nested within each other, as also explained above. In FIG. 1 the extendable conveyor 1 is shown in an extended position, where the mechanically extendable sections 3, 7 are telescopically extended. The mechanically extendable sections are supported or cantilevered by the next inwardly or rearwardly positioned extendable section and the base unit 2 and are nested within one another, such that the sections can be retracted into the base unit 2 to a stored position which minimizes interference with the floor space of a loading dock when the conveyor 1 is not in use.

A conveying surface in the form of a belt 12 (FIG. 6) extends over all mechanically extendable sections 3, 7. The belt 12 is driven by a belt drive located in the base unit 2.

Each intermediate section 3 has a lower side 4 and an upper side 5. A light source 6 is positioned on each lower side 4 of each intermediate section 3, which is also referred to as a "floor light" hereinafter. The floor light 6 is positioned in an end portion, for example, at the edge of each lower side 4 of each intermediate section 3. The end portion faces in a forward direction towards the fully extended position of the extended conveyor 1.

Figure 2:
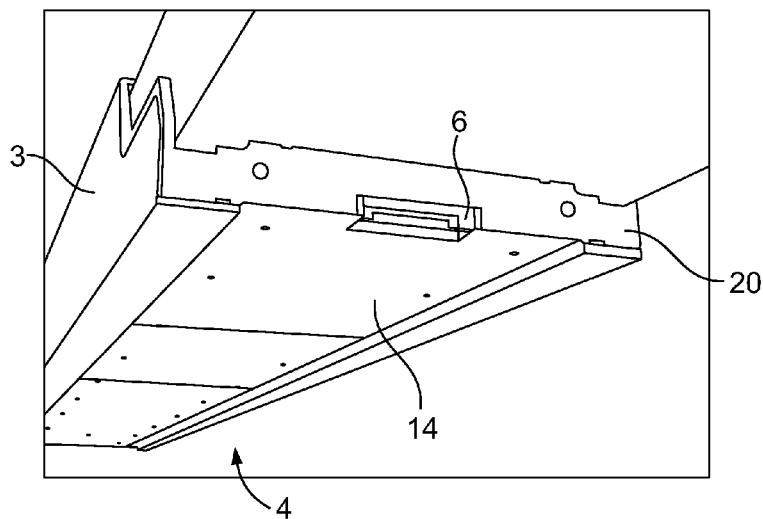
FIG. 2 illustrates an example floor light source of an extendable conveyor section of the example extendable conveyor of FIG. 1.

In more detail, as can also be seen from FIG. 2, the floor light 6 is positioned at an edge portion which is formed by an underguard 14, extending substantially horizontally and parallel at the lower side 4 of each of the intermediate sections 3, and a vertical or lateral plate 20 that provides an inspection hatch 20. The inspection hatch 20 extends laterally or vertically from the outer edge of the underguard 14 and upwards to the lower side 4 of the next intermediate section 3.

Figure 3:
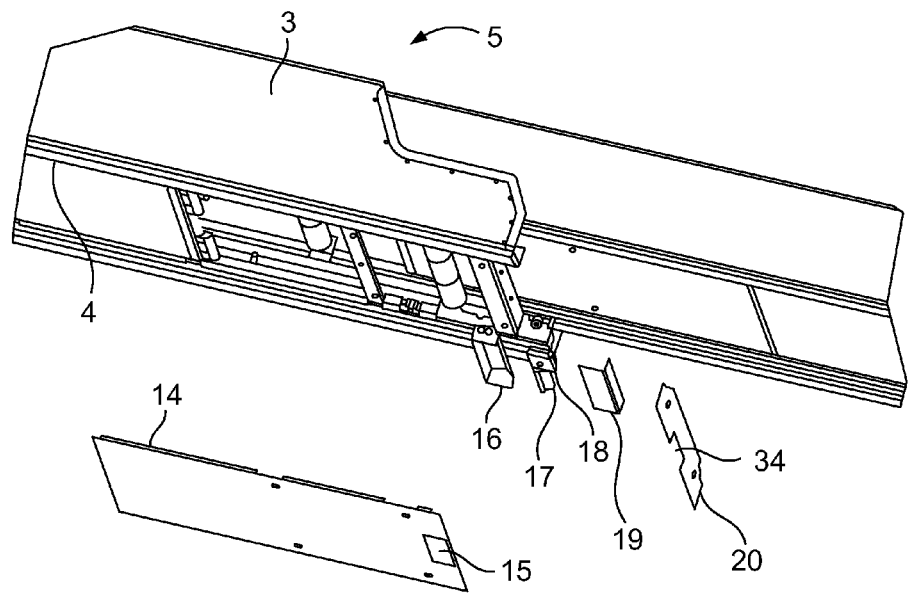
FIG. 3 is an exploded view of the extendable conveyor section of the example extendable conveyor of FIGS. 1 and 2 illustrating a floor light source.

The floor light 6, as can be seen in more detail form the exploded view of FIG. 3, includes a reflector house 16, a LED lamp 17, such as a Phillips Fortimo LLM with a power consumption of 12 W and 1100 lumen, a LED driver 18, and a LED lens cover 19.

The LED lamp 17 is housed within the LED reflector house 16 which, in turn, is mounted to the intermediate section 3. The LED reflector house 16 reflects the light such that it illuminates an area 13 (FIG. 1) below each of the intermediate sections. The LED reflector house 16 has an L-shaped cross section, such that light from the LED lamp 17 is reflected in a forward direction and in a downward direction such that mainly the area in front of and below the floor light 6 is illuminated.

The LED reflector house 16 with the LED lamp 17 is closed or covered by the LED lens cover 19, which, in this example, has an L-shape such that the LED reflector house 16 and the LED lens cover 19 couple together to form a closed housing for the LED lamp 17 when assembled. The LED lens cover 19 is shaped to diffuse light rays from the LED lamp 17 in order to equally or evenly illuminate the area 13.

The underguard 14 is mounted by screws to the underside of the intermediate section 13. The underguard 14 has an opening 15 for at least partially receiving the floor light 6.

Similarly, the inspection hatch 20 is mounted to the underside of the intermediate section 13 by screws, such that it can be removed for inspection of the floor light 6, e.g. for changing the LED lamp 17. The inspection hatch 20 has a cut-out 34 for partially receiving the floor light 6.

The LED lamp 17 is operated via the LED driver 18, which is connected to a central control (not shown). In some examples, as also explained in more detail below in association with FIG. 7, only one LED driver is used for operation of multiple LED lamps.

As mentioned above, the outmost section 7 (FIGS. 4 to 6) is located at the end of the extendable conveyor 1 opposite to the base unit 2. Also the outmost section 7 has a light source 10, which is referred to as "floor light 10" hereinafter. The floor light 10 is positioned in a front portion of the outmost section 7 on its lower side 8, which is opposite to the upper side 9 of the outmost section 7.

Figure 6:
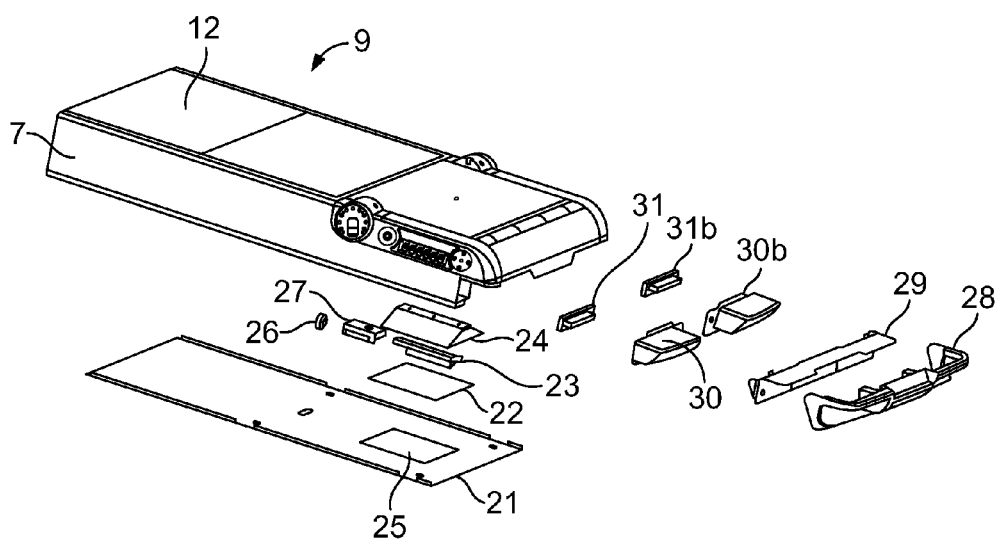
FIG. 6 is an exploded view of the outmost extendable conveyor section showing the floor light source and front light sources.

The floor light 10 of the outmost section 7 has a LED lens cover 22, a LED lamp 23 and a LED reflector 24 (FIG. 6). The reflector 24 together with the plate-shaped lens cover 22 forms a housing in which the LED lamp 23 is located or housed.

The reflector 24 has a triangular cross section and its longitudinal axis is substantially parallel to the longitudinal axis of the outmost section 7. Due to the triangular cross section of the reflector 24, light from the LED lamp 23, which is reflected by the reflector, is expanded transversally to the longitudinal axis of the reflector 24 such that an area underneath the outmost section 7 is substantially equally or evenly illuminated. Moreover, because the LED lamp 23 is parallel with its longitudinal axis to the longitudinal axis of the reflector 24, the light from the LED lamp 23 is mainly distributed transversely to the longitudinal axis of the LED lamp 23, and, thus, mainly transversely to the longitudinal axis of the outmost section 7. The lens cover 22 has a plate-like shape and enhances the equal or even distribution of light rays originating from the LED lamp 23.

On the lower side 8 of the outmost section 7 an underguard 21 is a screw-mount that has an opening 25 adapted to the shape and dimension of the floor light 10, such that the light of the floor light 10 gets through the opening within the underguard 21.

Additionally, the outmost section 7 also has two front light sources 11*a, b* on the front of the outmost section 7. The front light sources 11*a*, 11*b* are spaced apart from each other and are located on the right (11*a*) and left (11*b*) side on the front side of the outmost section 7.

The front light sources 11*a* and 11*b* each are located in a bumper 28 which is also located at the front side of the outmost section 7. Each front light source 11*a* and 11*b* has a LED lamp 31*a* and 31*b*, respectively, and a LED lens cover 30*a* and 30*b*, respectively. A single LED reflector 29 is formed such that it can engage into an inner side of the bumper 28 and such that the LED lens covers 30*a* and 30*b* can engage into respective openings within the reflector 29.

The LED lamps 31*a* and 31*b* are located within the respective LED lens cover 30*a* and 30*b*, when the front light sources 11*a* and 11*b* are assembled together. The LED lens covers 30*a* and 30*b* each are such shaped to form a housing for each of the two LED lamps 31*a* and 31*b*.

The reflector 29 has an L-shaped cross section such that light from the LED lamps 31*a* and 31*b* is reflected or directed in a downward and forward direction. Thus, an area in front of and/or below the front side of the outmost section 7 is illuminated by the front light sources 11*a* and 11*b*. This is useful, for example, when the outmost section 7 is moved into a typically dark place, such as a cargo container or the like. In such cases, the front light sources 11*a* and 11*b* illuminate the surrounding working are of the outmost section 7, thereby making the working are more comfortable and safer, since obstacles, sharp edges, and the like, can easily be seen by personnel working in the illuminated working area.

The floor lights 6 of the intermediate sections 3 as well as the floor light 10 and the front light sources 11*a* and 11*b* of the outmost section 7 are controlled in some examples by a central control unit 32, as will be explained in the following with reference to FIG. 7. The central control unit 32 can be located anywhere at or within the extended conveyer 1, for example, in the base unit 2.

In some examples, the extendable conveyor 1 has a light sensor 26 (see also FIG. 6) which is located on the lower side 8 of the outmost section 7 and which is connected to the central control unit 32. In the case that the ambient light surrounding the light sensor 26 has a strength detected by the light sensor 26 which is below a predefined value or threshold, the central control unit 32 will switch on the floor lights 6 and 10 and the front lights 11*a* and 11*b*, which are also connected to the central control unit 32. Thereby, the extendable conveyor 1 can automatically switch on the floor 6, 10 and front light sources 11*a* and 11*b* based on the ambient light strength. In the case that the ambient light strength exceeds or is greater than the predetermined value or threshold, the central control will switch off the floor lights 6 and 10 and the front light sources 11*a* and 11*b*.

In some examples, the ambient light strength is detected, for example, on a section-by-section basis and each floor light 6 and/or 10 is switched on/off on a section-by-section basis. In such examples, each extendable section has its own light sensor which controls switching of a respective floor light of the section.

Moreover, in some examples, the extendable conveyor 1 also has a proximity sensor 33, which is located, for example, on the outmost section 7, and which detects approaching personnel. In the case that an approaching personal is detected by the proximity sensor 33, the central control unit 32, to which the proximity sensor 33 is connected, will switch on the floor lights 6 and 10 as well as the front light sources 11*a* and 11*b*. Also this can be done on a section-by-section basis, where each section has a proximity sensor controlling the light sources of the respective section.

Figure 7:
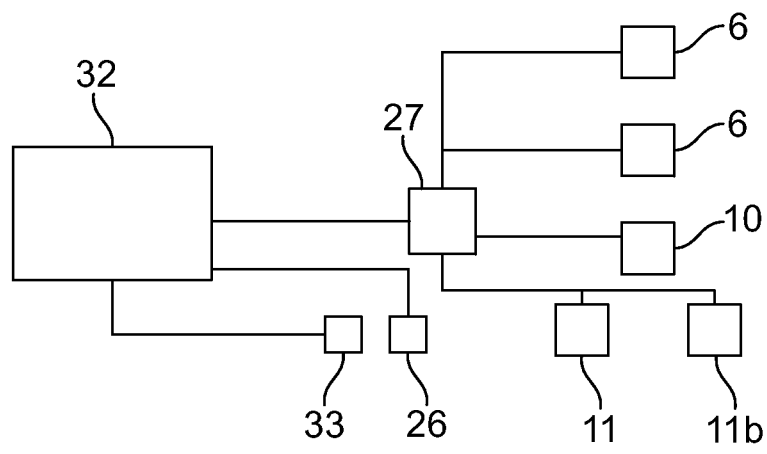
FIG. 7 schematically illustrates an example control switch to control a light source of an example extendable conveyor constructed in accordance with the teachings disclosed herein.

In the example illustrated in FIG. 7, a central LED driver 27 is connected to the central control unit 32 as well as with the floor lights 6 and 10 and the front lights 11*a* and 11*b*. Thus, the central control unit 32 only needs to control the central LED driver 27 for switching the lights 6, 10, 11*a*, 11*b* on and off, which are connected to the LED driver.

The central control unit 32, the proximity sensor 33, the light sensor 26, the LED driver(s) and the light sources 6, 10, 11*a* and 11*b* are connected with lines to each other. In other examples, a bus system, such as a Modbus or LON-network is used for connecting the central control and/or the sensors and the light sources with each other.

In other examples, each light source has its own LED driver which is connected to the central control. In still other examples, one LED driver operates, for example, a group of light sources, such as the light sources of once section. For instance, in some embodiments, the LED driver of the outmost section (e.g. LED driver 27 in FIG. 6) operates the floor light 10 and the front light sources 11*a* and 11*b* of the outmost section 7. In still other examples other groups are formed, such as one LED driver for the floor lights of two intermediate sections, etc.

In the example explained in connection with FIG. 7, a central control controls the switching of the light sources. In other examples, the light sensor is directly connected to a specific light which is switched on/off upon detection of a predefined ambient light strength. Similarly, in some examples, a proximity sensor is directly connected to a specific light which is switched on/off upon detection of approaching personnel.

In the examples explained above, there is only one light/proximity sensor present. In other examples, each extendable section has a light sensor and/or proximity sensor. In still other examples, groups of light sources are controlled by a light sensor, such as the light sources of two consecutive extendable section, etc.

In some examples, the control unit controls the floor lights and/or the front lights in order to communicate a message to personnel, for example, in order to alert them. For example, in the case that the conveyor is extended or retracted, the floor/front lights can flash and/or the lights can be consecutively driven from the base unit to the outmost section in the case of expansion and consecutively from the outmost section to the base unit in the case of retraction of the conveyor. In some examples, the light sources are configured to vary the color of the light rays emitted by the light source and/or the brightness, and the light colors and/or the brightness of the different light sources are varied in order to communicate or alert for example, personnel. For instance, the light color of light sources is switched to bright red in the case that the conveyor is extended or retracted.

As also illustrated in FIG. 1, in some examples, a floor light 6' is positioned on the lower side 4 spaced apart from the front edge of each one of the intermediate sections 3, where the floor light 6 is located. The floor light 6' is similar to the floor light 10 of the outmost section 7 and is similarly configured. Thus, the floor light 6' also includes a LED lens cover, a LED lamp and a LED reflector, as described in detail for the floor light 10 above. As mentioned, the reflector together with the plate-shaped lens cover forms a housing in which the LED lamp is located.

The examples explained above can also be combined with each other.

In some examples, an extendable conveyor for conveying articles comprises a base unit, at least one mechanically extendable section supported in a cantilevered manner and selectively positionable relative to the base unit, a conveying surface for conveying articles extending at least partially on an upper side of the at least one mechanically extendable section, and at least one light source positioned at a lower side of the at least one mechanically extendable section for illuminating at least an area below the at least one mechanically extendable section.

In some examples, an extendable conveyor for conveying articles comprises a base unit, at least one mechanically extendable section supported in a cantilevered manner and selectively positionable relative to the base unit, a conveying surface for conveying articles extending at least partially on an upper side of the at least one mechanically extendable section, where one of the at least one mechanically extendable section is an outmost mechanically extendable section including at least one light source positioned at its lower side for illuminating at least an area below the outmost mechanically extendable section. At least one front light source is positioned at a front part of the outmost mechanically extendable section for illuminating a front area below and/or in front of the outmost mechanically extendable section.

In some examples, an extendable conveyor for conveying articles comprises a base unit, at least two mechanically extendable sections supported in a cantilevered manner and selectively positionable relative to each other and the base unit, where one of the at least two mechanically extendable sections is an outmost mechanically extendable section, and the remaining mechanically extendable sections are intermediate mechanically sections being positioned between the base unit and the outmost mechanically extendable section. A conveying surface for conveying articles extends at least partially on an upper side of the at least one mechanically extendable section and at least some of the intermediate mechanically extendable sections include at least one light source positioned at a front edge and/or a lower side for illuminating at least an area below the intermediate mechanically extendable sections.

It is noted that this patent claims priority from European Patent Application Serial Number 12 001 400.6, which was filed on Mar. 1, 2012, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An extendable conveyor for conveying articles, the conveyor comprising:
   a base unit;
   an intermediate mechanically extendable section supported in a cantilevered manner and selectively positionable relative to the base unit, the intermediate mechanically extendable section being positioned between the base unit and an outmost mechanically extendible section;
   a conveying surface to convey articles, the conveying surface extending at least partially on an upper side of the intermediate mechanically extendable section; and
   a first light source positioned at a lower side of the intermediate mechanically extendable section to illuminate at least an area below the intermediate mechanically extendable section, the first light source having a light reflector to reflect light in a direction opposite to the lower side of the intermediate mechanically extendable section and towards the area below the intermediate mechanically extendable section.

2. The extendable conveyor of claim 1, wherein the first light source comprises a light-emitting diode lamp.

3. The extendable conveyor of claim 1, wherein the first light source is positioned such that it is hidden when the intermediate mechanically extendable section is in a fully nested position.

4. The extendable conveyor of claim 1, wherein the first light source comprises a lens cover.

5. The extendable conveyor of claim 1, wherein the first light source is to radiate light rays in a direction below a height of about 1.5 meters.

6. The extendable conveyor of claim 1, wherein the outmost mechanically extendable section further comprises at least one front light source to illuminate a front area at least one of below or in front of the outmost mechanically extendable section, the front light source being positioned at a front part of the outmost mechanically extendable section.

7. The extendable conveyor of claim 6, wherein the front light source comprises a light emitting diode lamp, a lens cover or a light reflector.

8. The extendable conveyor of claim 6, further comprising a sensor to sense ambient light, at least one of the first light source or the front light source to be switched on when an ambient light strength detected by the light sensor is less than a threshold.

9. The extendable conveyor of claim 6, further comprising a proximity sensor to sense approaching personnel, at least one of the first light source or the front light source being switched on when the proximity sensor detects an approaching person.

10. The extendable conveyor of claim 6, further comprising a control unit to control the first light source or the front light source in a pattern.

11. The extendable conveyor of claim 10, wherein the pattern includes at least one of flashing, changing color, changing brightness, or a time sequence of switching on and off.

12. An extendable conveyor for conveying articles, the conveyor comprising:
a base unit;
an intermediate mechanically extendable section supported in a cantilevered manner and selectively positionable relative to the base unit, the intermediate mechanically extendable section being positioned between the base unit and an outmost mechanically extendable section, the outmost mechanically extendable section including at least one front light source to illuminate a front area at least one of below or in front of the outmost mechanically extendable section, the front light source being positioned at a front part of the outmost mechanically extendable section;
a conveying surface to convey articles, the conveying surface extending at least partially on an upper side of the intermediate mechanically extendable section;
a first light source positioned at a lower side of the intermediate mechanically extendable section to illuminate at least an area below the intermediate mechanically extendable section; and
a control unit to control at least one of the first light source or the front light source in a pattern, the pattern includes at least one of flashing, changing color, changing brightness, or a time sequence of switching on and off, and the control unit to control the at least one of the first light source or the front light source in response to at least one of a movement of the base unit, a movement of the intermediate mechanically extendable section, a movement of the outmost mechanically extendable section, or a detection of an approaching person.

13. An extendable conveyor for conveying articles, the conveyor comprising:
a base unit;
an outmost mechanically extendable section selectively positionable relative to the base unit, the outmost mechanically extendable section being furthest from the base when the extendable conveyor is in an extended position;
an intermediate mechanically extendable section supported in a cantilevered manner and selectively positionable relative to the base unit, the intermediate mechanically extendable section being positioned between the base unit and the outmost mechanically extendable section when the extendable conveyor is in the extended position;
a conveying surface to convey articles extending at least partially on at least one of an upper side of the outmost mechanically extendable section or the intermediate mechanically extendable section, each of the intermediate mechanically extendable section and the outmost mechanically extendable section including a first light source positioned at a lower side of the respective ones of the intermediate and outmost mechanically extendable sections to illuminate an area below at least one of the intermediate mechanically extendable section or the outmost mechanically extendable section; the first light source having a light reflector to reflect light in a direction opposite to the lower side of the respective ones of the intermediate mechanically extendable section and the outmost mechanically extendable section and towards the area below at least one of the intermediate mechanically extendable section or the outmost mechanically extendable section; and
a front light source positioned at a front part of the outmost mechanically extendable section to illuminate a front area below and in front of the outmost mechanically extendable section.

14. The extendable conveyor of claim 13, wherein the intermediate mechanically extendable section comprises a first mechanically extendable section and a second mechanically extendable section, the first mechanically extendable section being movable relative to the second mechanically extendable section, and the first and second mechanically extendable sections being positioned between the base unit and the outmost mechanically extendable section, each of the first and second mechanically extendable sections including the first light source.

15. The extendable conveyor of claim 14, wherein at least one of the first light source or the front light source comprises a light-emitting diode lamp.

16. The extendable conveyor of claim 13, wherein the first light source positioned at the lower side of the outmost mechanically extendable section is not visible when the outmost mechanically extendable section is in a fully nested position.

17. The extendable conveyor of claim 13, wherein at least one of the first light source or the front light source comprises a lens cover.

18. The extendable conveyor of claim 13, wherein the front light source comprises a light reflector.

19. The extendable conveyor of claim 13, wherein at least one of the first light source or the front light source is to radiate light rays in a direction below a height of about 1.5 meters.

20. The extendable conveyor of claim 13, further comprising a light sensor to sense ambient light, at least one of the first light source or the front light source being switched on when an ambient light strength detected by the light sensor is less than a threshold.

21. The extendable conveyor of claim 13, further comprising a proximity sensor to sense approaching personnel, at least one of the first light source or the front light source is switched on when the proximity sensor detects approaching personnel.

22. The extendable conveyor of claim 13, further comprising a control unit to control at least one of the first light source or the front light source in a pattern.

23. The extendable conveyor of claim 22, wherein the pattern includes at least one of flashing, changing color, changing brightness, or switching on or off according to a time sequence.

24. The extendable conveyor of claim 22, wherein the control unit is to control at least one of the first light source or the front light source in response to at least one of a movement of the base unit, a movement of the intermediate mechanically extendable section, a movement of the outmost mechanically extendable section, or a detection of an approaching person.

25. An extendable conveyor for conveying articles, said conveyor comprising:
   a base unit;
   first and second mechanically extendable sections supported in a cantilevered manner and selectively positionable relative to each other and the base unit, the first mechanically extendable section being an outmost mechanically extendable section and the second mechanically extendable sections being an intermediate mechanically extendable section positionable between the base unit and the first mechanically extendable section, the first mechanically extendable section including at least one of a first light source positioned at a lower side or a front light source to illuminate a front area at least one of below or in front of the first mechanically extendable section, the second mechanically extendable section including a second light source positioned at at least one of a front edge or a lower side, the second light source to illuminate an area below the second mechanically extendable section;
   a conveying surface to convey articles on an upper side of the first mechanically extendable section; and
   a control unit to control at least one of the first light source, the second light source, or the front light source in a predefined pattern in response to at least one of a movement of the base unit, a movement of the first mechanically extendable section, a movement of the second mechanically extendable section, or a detection of an approaching person.

26. The extendable conveyor of claim 25, wherein at least one of the first light source, the second light source, or the front light source comprises a light-emitting diode lamp.

27. The extendable conveyor of claim 25, wherein at least one of the first light source, the second light source or the front light source is not visible when the first and second mechanically extendable sections are in a fully nested position.

28. The extendable conveyor of claim 25, wherein at least one of the first light source or the second light source comprises a light reflector to reflect light in a direction opposite to the lower side of the first and second mechanically extendable sections and towards the area below the first and second mechanically extendable sections.

29. The extendable conveyor of claim 25, wherein at least one of the first light source or the second light source comprises a lens cover.

30. The extendable conveyor of claim 25, wherein at least one of the first light source or the second light source is to radiate light rays in a direction below a height of about 1.5 meters.

31. The extendable conveyor of claim 25, wherein the front light source is positioned at a front part of the first mechanically extendable section.

32. The extendable conveyor of claim 25, wherein the front light source comprises at least one of a light emitting diode lamp, a lens cover, or a light reflector.

33. The extendable conveyor of claim 25, further comprising a light sensor to sense ambient light, at least one of the first light source, the second light source or the front light source being switched on when an ambient light strength detected by the light sensor is less than a threshold.

34. The extendable conveyor of claim 25, further comprising a proximity sensor to sense an approaching person, at least one of the first light source, the second light source or the front light source being switched on when the proximity sensor detects approaching person.

35. The extendable conveyor of claim 25, wherein the predefined pattern includes at least one of flashing, changing color, changing brightness, or switching on/off in a time sequence.

* * * * *